April 12, 1949.    G. S. MERRILL    2,466,858
CALCULATING DEVICE
Filed May 29, 1946

Inventor:
George S. Merrill,
by
His Attorney.

Patented Apr. 12, 1949

2,466,858

UNITED STATES PATENT OFFICE 2,466,858

CALCULATING DEVICE

George S. Merrill, Cleveland, Ohio

Application May 29, 1946, Serial No. 672,966

5 Claims. (Cl. 235—61)

My invention relates to calculating devices and has for its object a simple and reliable device for calculating the square root of the sum of the squares of a series of values and particularly the square root of the sum of the squares of the individual deviations of a plurality of values from their arithmetic mean, or from some other base value.

When the square root of the sum of the squares of the individual deviations of a plurality of values from their arithmetic means is divided by the square root of the number of values in the set, which last mentioned operation can be carried out with an alignment chart provided in one form of the device, the standard deviation of the values in the set is obtained. The standard deviation, or root mean square deviation, is widely used in statistical analysis as a measure of dispersion. A supplementary scale can be added to the device to facilitate the calculation of the arithmetic mean, and of the mean deviation of a set of values.

In accordance with my invention I provide a disk mounted to rotate and slide in conjunction with two scales arranged at right angles with each other by which the square root of the sum of the squares of a series of values or of a series of deviations can be obtained. I also provide an alignment chart for determining the standard deviation using this square root of the sum of the squares.

Figure 1:
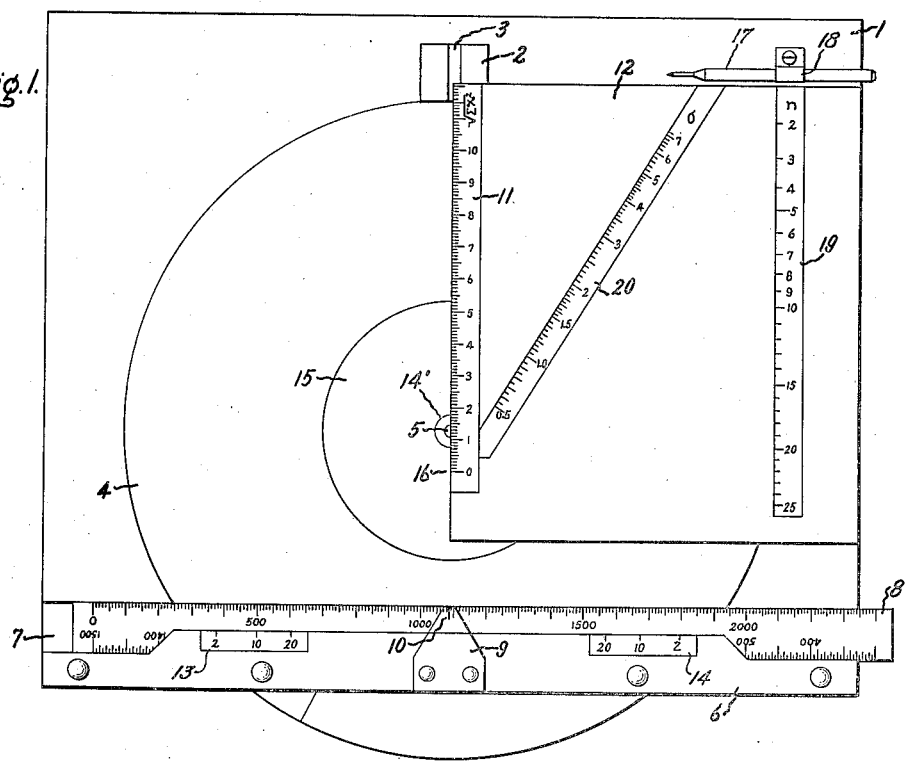
Figure 2:
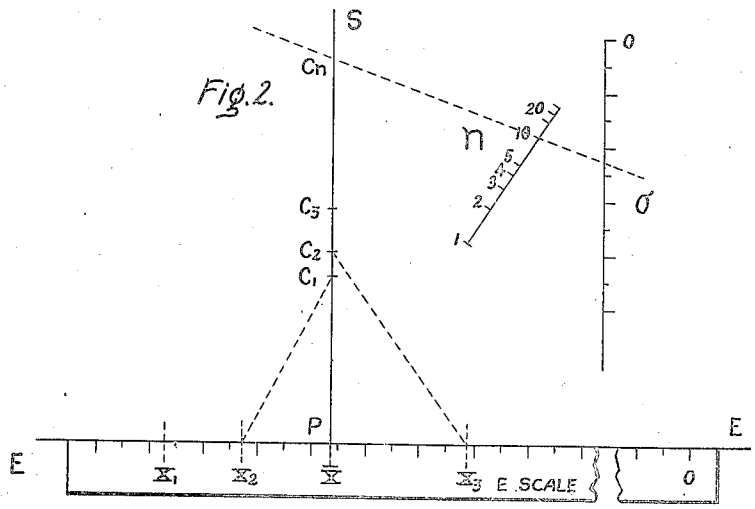

For a more complete understanding of my invention, reference should be had to the accompanying drawing, Fig. 1 of which is a plan view of a calculating device embodying my invention, while Fig. 2 is a diagrammatic view illustrating the principle of operation of the device shown in Fig. 1.

Referring to the drawing, in carrying out my invention in one form I provide a board or table 1 forming a support on which is secured a strip member 2 provided with a longitudinal straight slot 3 extending across the board from the top to the bottom, as seen in the drawing. On the board 1 is a plate member or disk 4 made of a suitable rigid material such as cardboard or thin metal and provided with a pivot pin 5 at its center which extends downward into the slot 3 whereby the disk is supported in parallel relation with the board 1 so that the disk can be rotated on the pin 5 and also moved up and down as seen in the drawing in a straight path as guided by the pin 5 in the slot 3, the path being defined by the center line of the slot 3. The upper surface of the disk consists of a smooth, flat, penetrable material, such as cardboard, linoleum, a plastic material, or a layer of heavy drawing paper, into which the point of a pin can be pressed.

Secured to the lower edge of the board 1 and extending at right angles with the slot 3 is a support 6 provided with a guide groove 7, also at right angles with the slot 3, in which is slidably supported a suitable straight edge scale member 8, the support 6 being secured to the board 1 in suitable spaced relation therewith so as to extend over the lower half of the disk 4. Mounted on the support 6 in a central position is a transparent index member 9 provided with an index line 10 which is directly above and parallel with the center line of the slot 3, and directly above and at right angles to the upper straight edge of the member 8. A second straight edge scale 11 is provided above the disk 4 and mounted on a plate 12 secured at its righthand edge by rivets to the board 1 so that the support 12 extends directly above the disk in closely spaced relation therewith. The scale 11 is perpendicular to the scale 8 and its lefthand edge lies just above the center line of the slot 3 so as to define the path of this center line.

In the operation of the device the arithmetic mean of the set of values or readings, preferably less than 25, is first obtained and the scale 8 is moved in the groove 7 until this arithmetic mean value appears just below the index line 10. Scale values are chosen for scale 8 so that the individual values in the set will fall within the limits indicated on the supplementary scales 13 and 14 on support 6 as shown for 2, 10 and 20 values in the set. The disk 4 is then moved downward in the groove 3 to a starting position with reference to the scale 8. This position, determined by a stop (not shown) in the slot, must be such that the center of the disk is exactly under and thus in registering relation with the reference point of intersection of the upper straight edge of the scale 8 and the index line 10. It will be noted that this reference point of intersection is the point of intersection of lines defined by the straight edges of the scales 8 and 11. In the device shown, the disk is provided with a concentric circle 15 on its upper surface having a radius equal to the distance between the 0 mark 16 on the scale 11 and the upper edge of the scale 8 whereby the reading of the values on scale 11 is facilitated. In the starting position the reading of circle 15 on scale 11 is zero.

The various values of the set of readings are now applied to the device by rotation of the disk together with sliding movement upward of the disk. This is done by means of a suitable pin 17 shown mounted in a spring clip holder 18, the sharp point of which is pressed vertically into the upper surface of the disk in contact with the upper edge of the scale 8 at a point on the scale corresponding to the value to be entered. The distance of the pin from the index line 10 will then of course represent the deviation of that value from the arithmetic mean. As a practical matter the first value to be entered should preferably be one with a fairly large deviation. With the point of the pin held firmly in the disk and against the upper edge of the scale 8, the disk is now rotated by touching the edge lightly with the other hand so that the pin moves toward the right hand along the upper edge of the scale 8 in engagement therewith to the index line 10, the pin then being at the point of intersection of the straight edge and the path of movement of the disk. In effecting this movement of the pin the disk as it rotates slides upward along the slot 3. The disk is then maintained with its center in the new position until the pin has been pressed into the disk at the point on the scale 8 corresponding to the next value to be entered in the device and then the disk is turned and moved in the slot to bring the pin opposite the index line 10 as before. The remaining values are entered in the same way, the center of the disk moving farther away from its initial position with each operation.

When all of the values have been entered, the distance from the 0 point 16 to the intersection of the upper half of circle 15 with the scale 11 represents the square root of the sum of the squares of the deviations of the values from their arithmetic mean provided the scale 11 is identical with the scale 8. These values read on the scale 11 must be divided by the square root of the number of values, and multiplied by the scale correction factor if the two scales are dissimilar, in order to obtain the standard deviation of the set of values. The value of this correction factor is the number of units on scale 8 corresponding to a unit length on scale 11. A small circle 14' is drawn on the disk 4 about the center of rotation with a diameter equal to one unit of the scale 11. The diameter of this scale circle 14' is read on the scale 8 when the disk is in its initial position to determine the scale correction factor. To facilitate the division by the square root of the number of values an alignment chart is provided on the support 12 consisting of a scale 19 parallel with the scale 11, which scale 19 is graduated to indicate the number of values up to 25, and a diagonal scale 20 which is graduated to give the standard deviation. After the values have been entered on the disk, as previously described, a straight edge line, or fine thread is held across the two scales 11 and 19 from the reading on the scale 11 to the number of values as indicated on the scale 19. Then the standard deviation is the value read from the scale 20, multiplied by the scale correction factor.

The principle of operation of the device may be more clearly described by reference to Fig. 2. Given a set of $n$ values, $X_1, X_2, X_3, \ldots X_n$ having an arithmetic mean $X$, for which the standard deviation $\sigma$ is required. Let the deviations of the individual values in the set from their arithmetic mean be $$x_1 = X_1 - \overline{X}, \quad x_2 = X_2 - \overline{X}, \text{ etc.}$$

The standard deviation (or root-mean-square deviation about the arithmetic mean) of the set is defined as follows:

$$\sigma = \sqrt[2]{\frac{x_1^2 + x_2^2 + x_3^2 + \ldots x_n^2}{n}}$$

The square root of the numerator can be found by the geometric construction illustrated in Figure 2, and this value is then divided by $\sqrt{n}$ to obtain $\sigma$. At the point P on the line EE erect a perpendicular PS. Place a movable scale along the line EE so that the arithmetic mean X is at the point P at the foot of the perpendicular.

Lay off the length from P to $X_1$ (the first value in the set) on the perpendicular PS so that $$PC_1 = X_1 - \overline{X} = x_1$$

Draw $C_1 X_2$. In the right angle triangle $C_1 P X_2$;

$$C_1 X_2 = \sqrt{(PC_1)^2 + (PX_2)^2} = \sqrt{x_1^2 + x_2^2}$$

Lay off the length from $C_1$ to $X_2$ on the perpendicular PS so that $PC_2 = C_1 X_2$. Draw $C_2 X_3$. In the right angle triangle $C_2 P X_3$;

$$C_2 X_3 = \sqrt{x_1^2 + x_2^2 + x_3^2}$$

Lay off the length from $C_2$ to $X_3$ on the perpendicular PS so that $PC_3 = C_2 X_3$ and continue the operation for successive values of X to $X_n$. The final length $PC_n$ is then measured in terms of the scale units used on the movable E scale, and divided by $\sqrt{n}$ gives the standard deviation desired. To facilitate this division an alignment chart can be used, in which case the length PC does not have to be read. The chart can be constructed so that the length from 0 (on $\sigma$ scale) to the intersection of the dotted line drawn through $C_n$ and $n$, will give the standard deviation of the set of "$n$" values in the same units used for the E scale. This is an alternative method of construction of the alignment chart from that used in Fig. 1. It is used in Fig. 2 so that $\sigma$ will appear on the evenly divided arithmetic scale corresponding to the scale E.

The rotating-sliding disk with its center moving along the line PS (the center line of a slot perpendicular to the edge of the movable scale E) provides a quick and accurate means of transferring the length represented by the hypotenuse of each successive triangle, to the perpendicular PS, by moving the point of the pin, pressed into the disk at successive values of X along the edge of the scale E to the point P at $\overline{X}$.

If desired, the scale 11 can be applied directly to the disk by means of concentric circles, in which case the final distance that the center of the disk has moved from its starting point can be determined from the concentric circular scale reading at the reference line 10. The square root of the sum of the squares of the departures read from the concentric circular scale is then divided by the square root of $n$ and multiplied by the appropriate scale correction factor (which can be done easily on a slide rule) to obtain the standard deviation of the set.

For large values of $n$ the standard deviation can be obtained by reading the square roots of the sums of deviations squared from the grand average for small groups, and then combining these on the slide-disk to obtain the square root of the sums of their squares.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. A calculating device comprising a support, straight guide means on said support, a disk provided with a penetrable material on a first side, means on the other side of said disk cooperating with said guide means for mounting said disk on said support with its said first side uppermost so that said disk is rotatable about its center and movable in a straight path defined by said guide means, a scale support secured to said first support in spaced relation therewith and extending over said disk, a straight edge scale secured on said scale support for movement lengthwise thereon and extending substantially at right angles with said path, and a second straight edge scale secured to said support above said disk in substantial parallel relation with said guide means and having its edge passing through the axis of rotation of said disk.

2. A calculating device comprising a support, said support being provided with a straight guide groove, a disk provided with a penetrable material on an upper side, a pivot pin at the center of said disk projecting from its lower side into said groove and slidable between the sides of said groove so that said disk is rotatable on said pin and movable in a straight path along said groove, a scale support secured to one side of said first support in spaced relation therewith and extending over said disk, a first straight edge scale member secured on said scale support for movement lengthwise thereon and extending at right angles with said groove, an index member secured to said scale support provided with an index mark directly above the center of said groove and said scale, and a second straight edge scale member on said support having its edge above said disk and parallel with the center line of said groove, whereby a pin may be inserted in said disk at a point opposite a selected value on said first scale and moved along said straight edge to said index mark with rotation of said disk and movement of said disk along said straight path and when a plurality of values are then applied the total movement of said disk along said straight path is equal to the square root of the sum of the squares of said values.

3. A calculating device comprising a support, a first straight edge scale secured to said support defining a predetermined path, a second straight edge scale mounted on said support at right angles with said first scale, a pivoted plate member extending between said scales and movable relative thereto, and pivot means secured to said plate member slidably movable with said plate member along said path from the point of intersection of said path and said second scale when a plurality of points on said plate member opposite selected values on said second scale are moved successively along said second scale to said point of intersection, whereby the movement of said pivot means relative to said first scale is the square root of the sum of the squares of said selected values.

4. A calculating device comprising a support, a first straight edge scale secured to said support defining a predetermined path, a second straight edge scale mounted on said support at right angles with said first scale and for slidable movement lengthwise on said support, an index member secured to said support provided with an index mark at the point of intersection of said path with said second scale, a pivoted plate member extending between said scales and movable relative thereto, pivot means secured to said plate member slidably movable with said plate member along said path from said point of intersection when a plurality of points on said plate member opposite selected values on said second scale are moved successively along said second scale to said index mark, whereby the movement of said pivot means relative to said first scale is the square root of the sum of the squares of said values.

5. A calculating device comprising a support, guide means on said support defining a predetermined path, a pivoted plate member provided with a penetrable material on a first side, pivot means secured to the other side of said plate member slidably cooperating with said guide means for pivotally mounting said plate member on said support with its said first side uppermost and providing for additional movement of said plate member by movement of said pivot means in said path, a first straight edge scale secured to said support in parallel relation with said guide means and with its straight edge passing through the pivot axis of said plate member, and a second straight edge scale mounted on said support above said plate member at right angles with said path.

GEORGE S. MERRILL.

REFERENCES CITED

The following references are of record in the file of this patent:

UNITED STATES PATENTS

| Number | Name | Date |
|---|---|---|
| 552,914 | Laughlin et al. | Jan. 14, 1896 |
| 889,360 | Fellows | June 2, 1908 |

FOREIGN PATENTS

| Number | Country | Date |
|---|---|---|
| 367,292 | Italy | Jan. 20, 1939 |
| 427,117 | Great Britain | Apr. 16, 1935 |